United States Patent
Park

(10) Patent No.: US 10,023,113 B2
(45) Date of Patent: Jul. 17, 2018

(54) APPARATUS AND METHOD FOR DETECTING EMERGENCY SITUATION OF VEHICLE

(71) Applicant: MANDO CORPORATION, Pyeongtaek-si, Gyeonggi-do (KR)

(72) Inventor: Man Bok Park, Seoul (KR)

(73) Assignee: MANDO CORPORATION, Pyeongtaek-si (KR)

(*) Notice: Subject to any disclaimer, the term of this patent is extended or adjusted under 35 U.S.C. 154(b) by 238 days.

(21) Appl. No.: 14/876,718

(22) Filed: Oct. 6, 2015

(65) Prior Publication Data

US 2016/0096473 A1 Apr. 7, 2016

(30) Foreign Application Priority Data

Oct. 6, 2014 (KR) .................. 10-2014-0134316

(51) Int. Cl.
| | | |
|---|---|---|
| *G08B 25/10* | (2006.01) | |
| *B60Q 9/00* | (2006.01) | |
| *H04L 29/08* | (2006.01) | |
| *G08B 25/01* | (2006.01) | |

(52) U.S. Cl.
CPC ............. *B60Q 9/00* (2013.01); *G08B 25/016* (2013.01); *H04L 67/12* (2013.01)

(58) Field of Classification Search
CPC .......... B60Q 9/00; G08B 25/016; H04L 67/12
USPC ........................................ 340/436
See application file for complete search history.

(56) References Cited

U.S. PATENT DOCUMENTS

| 6,580,981 B1* | 6/2003 | Masood ................ G08G 1/205 340/425.5 |
| 2004/0246144 A1* | 12/2004 | Siegel .................... G08G 1/087 340/902 |
| 2007/0109146 A1* | 5/2007 | Tengler ................ G08G 1/0965 340/902 |

(Continued)

FOREIGN PATENT DOCUMENTS

| KR | 1020120124994 A | 11/2012 |
| KR | 1020140050462 A | 4/2014 |

OTHER PUBLICATIONS

Korean Office Action corresponding to Korean Application No. 10-2014-0134316 dated Oct. 29, 2015.

*Primary Examiner* — Omer S Khan
(74) *Attorney, Agent, or Firm* — Hauptman Ham, LLP

(57) ABSTRACT

An apparatus for detecting an emergency situation of a vehicle comprises a sensor unit, an emergency situation determining unit and a communication unit. The sensor unit constitutes with one or more of a speed sensor, a wheel sensor, an acceleration sensor, a lateral acceleration sensor, a yaw rate sensor, and a tilt sensor. The emergency situation determining unit receives a signal from the sensor unit and determines whether a driver's vehicle is in an emergency situation. The communication unit creates at least one of an emergency situation message representing the emergency situation of the driver's vehicle and a release message representing the release of the emergency situation according to the determination result of the emergency situation determining unit, transmits the message to an external emergency situation propagation device, and allows the emergency situation propagation device to propagate an emergency propagation state of the driver's vehicle to the outside.

7 Claims, 8 Drawing Sheets

(56) References Cited

U.S. PATENT DOCUMENTS

| | | | |
|---|---|---|---|
| 2013/0088369 A1* | 4/2013 | Yu | B60W 40/09 |
| | | | 340/905 |
| 2013/0279491 A1* | 10/2013 | Rubin | G08G 1/166 |
| | | | 370/347 |
| 2013/0325940 A1* | 12/2013 | Foti | H04W 4/046 |
| | | | 709/204 |
| 2014/0324296 A1* | 10/2014 | Laoufi | B60R 21/01 |
| | | | 701/45 |
| 2015/0243143 A1* | 8/2015 | Chen | G08B 13/19619 |
| | | | 348/151 |
| 2016/0165424 A1* | 6/2016 | El-Dinary | H04W 4/90 |
| | | | 455/404.2 |

* cited by examiner

APPARATUS AND METHOD FOR DETECTING EMERGENCY SITUATION OF VEHICLE

CROSS-REFERENCE TO RELATED APPLICATION

This application claims priority from and the benefit under 35 U.S.C. § 119(a) of Korean Patent Application No. 10-2014-0134316, filed on Oct. 6, 2014, which is hereby incorporated by reference for all purposes as if fully set forth herein.

BACKGROUND OF THE INVENTION

1. Field of the Invention

The present invention relates to an apparatus and method for detecting an emergency situation of a vehicle and, more specifically, to an apparatus and method for detecting an emergency situation of a vehicle in which when an emergency situation of the vehicle is detected, the emergency situation is verified within a predetermined standby time and notified to a road-side unit, a surrounding vehicle, a rescue center, and the like, thereby more accurately detecting the emergency situation of the vehicle and rapidly rescuing the vehicle.

2. Description of the Prior Art

With the rapid increase of vehicles in the modern world, tens of millions of people die or are injured due to traffic accidents every year. Accordingly, various vehicle technologies have been developed to reduce casualties and economic losses caused by traffic accidents. Such technologies include an Automatic Cruise Control (ACC) technology, a lane change assistance technology, a lane departure warning technology, a parking assistance technology, and the like.

However, since the technologies use a sensor, a camera, or the like mounted in a vehicle, detection ranges and effects thereof are limited. Accordingly, technologies for recognizing a wider range of driving environment have emerged. One of the technologies is V2X technology. V2X, the abbreviation of Vehicle to Everything, includes Vehicle to Vehicle (V2V), Vehicle to Infrastructure (V2I), and Vehicle to Nomaice device (V2N).

Here, Road-Side Units (RSUs) installed around a road to communicate with a vehicle are used as an infrastructure. A vehicle communicates with road-side units installed around a road to establish a network and receives various types of information from the road-side units, thereby ensuring traffic safety and providing information, such as a guide or various types of multimedia content, to prevent congestion.

In order to rapidly rescue a vehicle when the vehicle is in danger of an accident or in an emergency situation, it is necessary to accurately detect the emergency situation of the vehicle and to inform the vehicle's emergency situation to a rescue center or a surrounding vehicle by expanding functions of the road-side units.

SUMMARY OF THE INVENTION

The present invention provides a vehicle emergency situation detecting system that can identify whether a vehicle is in an emergency situation and can transfer it to the outside through a road-side unit, thereby making it possible to rapidly rescue the vehicle.

In addition, the present invention provides a vehicle emergency situation detecting system that can verify an emergency situation of a vehicle within a predetermined standby time and then relay the vehicle's emergency situation when it is determined that the vehicle is in the emergency situation, thereby more accurately detecting the vehicle's emergency situation.

In accordance with one aspect of the present invention, an apparatus for detecting an emergency situation of a vehicle includes: a sensor unit constituted with one or more of a speed sensor, a wheel sensor, an acceleration sensor, a lateral acceleration sensor, a yaw rate sensor, and a tilt sensor; an emergency situation determining unit that receives a signal from the sensor unit and determines whether a driver's vehicle is in an emergency situation; and a communication unit that creates at least one of an emergency situation message representing the emergency situation of the driver's vehicle and a release message representing the release of the emergency situation according to the determination result of the emergency situation determining unit, transmits the message to an external emergency situation propagation device, and allows the emergency situation propagation device to propagate an emergency propagation state of the driver's vehicle to the outside.

In accordance with another aspect of the present invention, a method for detecting an emergency situation of a vehicle includes: a signal reception step of receiving a signal from a sensor unit constituted with one or more of a speed sensor, a wheel sensor, an acceleration sensor, a lateral acceleration sensor, a yaw rate sensor, and a tilt sensor; an emergency situation determination step of determining whether a driver's vehicle is in an emergency situation based on the signal from the sensor unit; and a message transmission step of creating at least one of an emergency situation message representing the emergency situation of the driver's vehicle and a release message representing the release of the emergency situation according to the determination result of the emergency situation determining unit, transmitting the message to an external emergency situation propagation device, and allowing the emergency situation propagation device to propagate an emergency propagation state of the driver's vehicle to the outside.

In accordance with another aspect of the present invention, a method for detecting an emergency situation of a vehicle includes: receiving an emergency situation message representing an emergency situation of an external vehicle from a vehicle emergency situation detecting device mounted in the external vehicle; determining that the external vehicle is in an emergency propagation state when information on the emergency situation is received from the external vehicle again, or the release message is not received within a preset standby time after the emergency situation message is received from the external vehicle; and propagating the emergency situation message of the external vehicle to an external device that includes a rescue center.

In the vehicle emergency situation detecting system of the present invention, when information that a vehicle is in an emergency situation is collected, the emergency situation is verified in a predetermined standby time and is notified to a rescue center, a road-side unit, a surrounding vehicle, and the like, which makes it possible to rapidly inform the vehicle's emergency situation to the rescue center and provide accurate information, thereby accomplishing an efficient rescue.

BRIEF DESCRIPTION OF THE DRAWINGS

The above and other objects, features, and advantages of the present invention will be more apparent from the fol

DETAILED DESCRIPTION OF THE EXEMPLARY EMBODIMENTS

Figure 1:
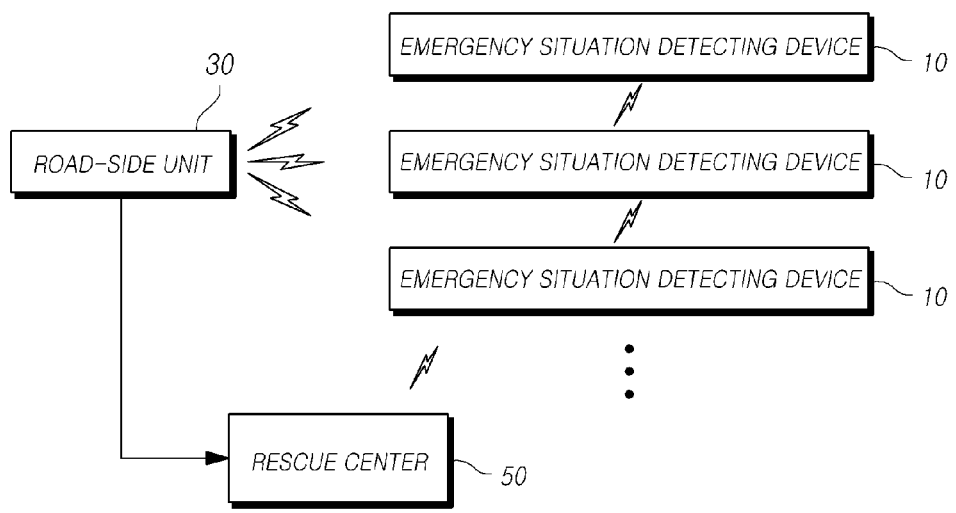
- FIG. 1 is a block diagram illustrating a constitution of a vehicle emergency situation detecting system according to an embodiment of the present invention.

Hereinafter, some embodiments of the present invention will be described in detail with reference to the accompanying illustrative drawings. In the following description, the same components will be designated by the same reference numerals although they are shown in different drawings. Further, in the following description of the present invention, a detailed description of known functions and configurations incorporated herein will be omitted when it may make the subject matter of the present invention rather unclear.

Figure 2:
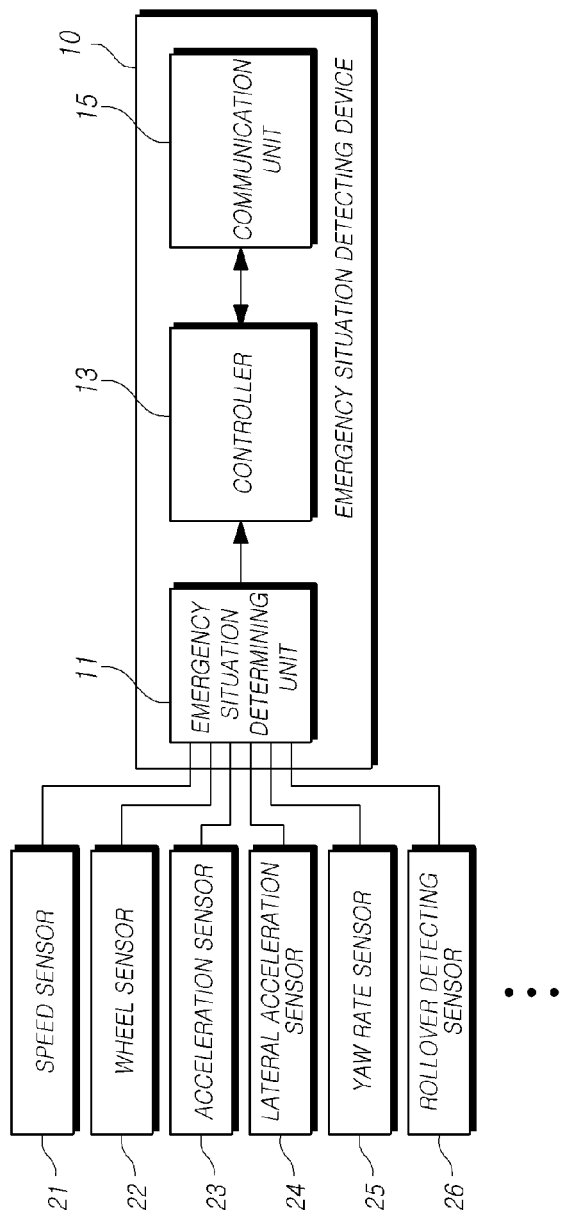
FIG. 2 is a block diagram illustrating a constitution of a vehicle that includes an emergency situation detecting device of FIG. 1.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component FIG. 1 is a block diagram illustrating a constitution of a vehicle emergency situation detecting system according to an embodiment of the present invention, and FIG. 2 is a block diagram illustrating a constitution of a vehicle that includes an emergency situation detecting device of FIG. 1.

In the vehicle emergency situation detecting system 1, according to the embodiment of the present invention, when an emergency situation detecting device 10, which is installed in the vehicle, detects an emergency situation of the vehicle and generates an emergency situation message, a surrounding vehicle and a road-side unit, which receive the emergency situation message, may have a predetermined standby time and may determine that the vehicle is in an emergency situation to generate a rescue request for rescuing the vehicle when a release message for the emergency situation is not received for the standby time.

The vehicle emergency situation detecting system 1 may include an emergency situation detecting device 10 installed in a vehicle to monitor an emergency situation thereof and a road-side unit 30 that is installed on a road side to communicate with the emergency situation detecting device 10 and request a rescue from a rescue center 50 when the vehicle is verified to be in an emergency situation.

The emergency situation detecting device 10 is installed in each vehicle and performs two main functions. One is a function of monitoring an emergency situation of a driver's vehicle and broadcasting information on the emergency situation to the surroundings, and the other is a function of receiving information on the emergency situation from a surrounding vehicle, verifying the corresponding information, and broadcasting the verified information to the surroundings.

To this end, the emergency situation detecting device 10 may include an emergency situation determining unit 11 that determines a vehicle's emergency situation, a communication unit 15 for communication with the outside, and a controller 13 that controls the transmission and reception of information according to a determination of an emergency situation.

The emergency situation determining unit 11 may receive detected information from various types of sensors and devices installed in the vehicle and determine whether the vehicle is in an emergency situation. The emergency situation determining unit 11 may be connected to an On-Board Diagnosis (OBD) terminal by using a Controller Area Network (CAN) communication line in order to receive signals detected by the various types of sensors and devices. Here, the emergency situation determining unit 11 may collect information, for example, by using a speed sensor 21, a wheel sensor 22, an acceleration sensor 23, a lateral acceleration sensor 24, a yaw rate sensor 25, a rollover detecting sensor 26, and the like, and may also collect information from various other sensors or devices in addition to the aforementioned sensors.

The acceleration sensor 23 may detect a change in a driving speed of the vehicle, and the emergency situation determining unit 11 may determine that the vehicle is in an emergency situation when a change in acceleration detected by the acceleration sensor 23 exceeds a preset threshold value, namely, when acceleration rapidly changes beyond the physical limit of the vehicle. For example, if the vehicle comes to an emergency stop in order to avoid an emergency situation, or stops due to a collision with another vehicle, acceleration is rapidly reduced, and it is therefore necessary to determine the rapid change of the acceleration to be an emergency situation.

The lateral acceleration sensor 24 may detect acceleration that is generated in a lateral direction while the vehicle drives, and the vehicle may be turned over, or may escape from a lane when lateral acceleration rapidly increases. Accordingly, when lateral acceleration rapidly increases to a level that is sufficient to turn over the vehicle, the emergency situation determining unit may determine that the vehicle is in an emergency situation.

The yaw rate sensor 25 may detect the rotating force about a vertical axis of the vehicle while the vehicle drives, and it may be determined that when the yaw rate value is above a predetermined level, the vehicle is rotating while sliding, and when the yaw rate value is not stable and fluctuates, the vehicle is not being controlled. Accordingly, when the yaw rate value is above a predetermined level or fluctuates, the emergency situation determining unit 11 may determine that the vehicle is in an emergency situation.

The rollover detecting sensor 26 may be a tilt sensor. The rollover detecting sensor 26 may detect a tilt of the vehicle, and may detect the rollover of the vehicle together with the lateral acceleration sensor 24. When a tilt of the vehicle, which is detected by the rollover detecting sensor 26, is above a predetermined level, the emergency situation determining unit 11 may determine that the vehicle is likely to be turned over, or has been turned over.

When the emergency situation determining unit 11 determines that the vehicle is in an emergency situation based on information provided from the sensors and devices in this way, the emergency situation determining unit 11 may determine the state of the vehicle by processing the information provided from the sensors and devices as described above, or may also determine the state of the vehicle based on whether the information provided from the sensors and devices is in agreement with each other.

For example, in cases where the vehicle is turned over towards a side and obliquely located on a sloped road, the speed of the vehicle detected by the speed sensor 21 is zero, but the acceleration sensor 23 detects acceleration. Further, if the vehicle is a front wheel drive vehicle, immediately after the vehicle is turned over while travelling, rear wheels may not rotate while the front wheels rotate. In these cases, the emergency situation determining unit 11 may determine that the vehicle is in an emergency situation because signals detected by the speed sensor 21 and the acceleration sensor 23 do not agree with each other, and drive signals of the front and rear wheels detected by the wheel sensor 22 do not agree with each other.

When it is determined that the vehicle is in an emergency situation, the emergency situation determining unit 11 may transfer the corresponding information to the controller 13. Furthermore, when values detected by the sensors and devices return to a normal range, the emergency situation determining unit 11 may transfer, to the controller 13, information for notifying that the vehicle is not in an emergency situation.

The communication unit 15 may support communication between the driver's vehicle and the surrounding vehicle and communication between the driver's vehicle and the road-side unit 30, and may use a wireless communication scheme, such as Wi-Fi, Wibro, etc. Alternatively, the communication unit 15 may also use a 5.8 GHz band of Dedicated Short Range Communication (DSRC) scheme that is highly accurate and has a high instantaneous communication speed.

Through the communication unit 15, the driver's vehicle may transmit signals generated from the emergency situation detecting device 10 thereof to a surrounding vehicle or the road-side unit 30, and may also receive signals transmitted from the surrounding vehicle or the road-side unit 30.

The controller 13 may perform a function of processing information that is generated by the driver's vehicle and transmitting the information to the outside, and may also perform a function of processing information received from the outside.

First, the function of the controller 13 for processing information generated by the driver's vehicle and transmitting the information to the outside will be described as follows.

The controller 13 may continually monitor a signal provided from the emergency situation determining unit 11, create an emergency situation message representing an emergency situation of the vehicle or a release message representing that an emergency situation is released according to a determination result of the emergency situation determining unit 11, and may broadcast the created message to a surrounding vehicle and the road-side unit 30 through the communication unit 15.

That is, when the emergency situation determining unit 11 determines that the vehicle is in an emergency situation, the controller 13 may control to create an emergency situation message and transmit the same through the communication unit 15, and when the emergency situation determining unit 11 determines that the emergency situation has ended, the controller 13 may control to create a release message and transmit the same through the communication unit 15. It is apparent that the controller 13 may also broadcast all information collected from the emergency situation determining unit 11, namely, information on a vehicle state collected from the sensors or devices, as well as the emergency situation message and the release message.

The emergency situation message and the release message may be a type of flag, and may be represented as SystemFailureSuspectFlag and SystemFailureRecoveryFlag, respectively.

Meanwhile, a message that the vehicle controller 13 uses when performing transmission through the communication unit 15 to the outside (a surrounding vehicle, a road-side unit, etc.) may be defined as a Basic Safety Message (BSM) that is pre-defined in a vehicle communication scheme.

The BSM may include a Part I message that is always transmitted at every communication period and a Part II message optionally transmitted as needed. The part I message may include DSRmsgID (1 byte), MsgCount (1 byte), TemporaryID (4 byte), DSecond (2 byte), Latitude/Longitude (each 4 byte), Elevation (2 byte), PositionalAccuracy (4 byte), TransmissionAndSpeed (2 byte), Heading (2 byte), SteeringWheelAngel (1 byte), AccelerationSet4Way (7 byte), BrakeSystemStatus (2 byte), VehicleSize (3 byte), and the like, and the Part II message may include VehicleSafeExtension and VehicleStatut messages.

Meanwhile, an emergency situation message (SystemFailureSuspectFlag) and a release message (SystemFailureRecoveryFlag) that are used in the present invention may be transmitted to the outside (a surrounding vehicle, a road-side unit, etc.) while being contained in the aforementioned Part II message.

Meanwhile, the function of the controller 13 for processing information received from the outside will be described as follows.

The controller 13 may receive a signal from a surrounding vehicle and determine whether the surrounding vehicle is in an emergency situation. When an emergency situation message is received from the surrounding vehicle, the controller 13 performs a process of verifying the emergency situation messages.

The controller 13 may stand by for a preset period of time from when receiving the emergency situation message to monitor whether an additional message is received from the relevant surrounding vehicle.

If a release message is received from the relevant surrounding vehicle within the standby time, the controller 13 may determine that the emergency situation of the relevant surrounding vehicle has been released.

In contrast, if the emergency situation message is received within the standby time again, or if the controller is in a non-response state where an additional message is not received, the controller 13 determines that the emergency situation of the relevant surrounding vehicle is sustained. In this case, because no additional message means that the relevant surrounding vehicle cannot create a message, the controller 13 may determine that the relevant surrounding vehicle is in an emergency situation.

If it is determined that the emergency situation of the surrounding vehicle is sustained, the controller 13 broadcasts the emergency situation message, which is received from the relevant surrounding vehicle, to the surroundings. Accordingly, information notifying that the relevant surrounding vehicle is in the emergency situation may be transmitted to the road-side unit 30, another surrounding vehicle, and the rescue center 50. Here, the rescue center 50 refers to an institution, such as 119, a fire station, a police station, etc., which can control an emergency situation of a vehicle.

Meanwhile, each emergency situation detecting device 10 may have a unique number, and a vehicle can be identified by using the unique number of the emergency situation detecting device 10. The controller 13 transmits the unique number of the emergency situation detecting device 10 together when transmitting the emergency situation message and the release message. Accordingly, when the emergency situation message and the release message are received, the vehicle that has transmitted the messages can be identified, and in particular, the rescue center 50 can easily identify the vehicle.

Figure 3:
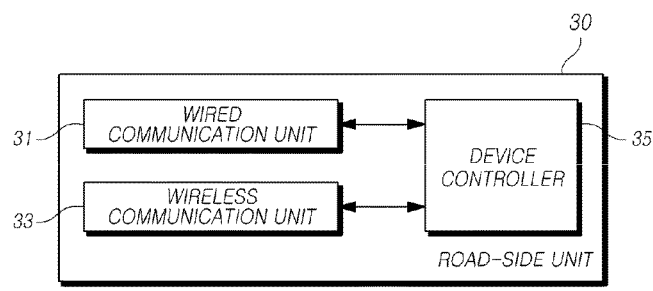
FIG. 3 is a block diagram illustrating a constitution of the road-side unit of FIG. 1.

FIG. 3 is a block diagram illustrating a constitution of the road-side unit of FIG. 1.

The road-side unit 30 may include a wired communication unit 31 for communication with another road-side unit 30 and the rescue center 50, a wireless communication unit 33 for communication with a vehicle, and a device controller 35 that transfers an emergency situation of the vehicle to the rescue center 50 through a verification process when receiving an emergency situation message from an emergency situation detecting device 10 of the vehicle.

The wired communication unit 31 may be connected to a wired network to support communication with the other road-side unit 30 therearound and the rescue center 150 and to support a TCP/IP protocol based communication.

The wireless communication unit 33 supports wireless communication with the emergency situation detecting device 10 installed in the vehicle and uses the same communication scheme as the emergency situation detecting device 10. Accordingly, the wireless communication unit 33 may communicate with the emergency situation detecting device 10 using one communication scheme of Wi-Fi, Wibro, and DSRC.

When an emergency situation message is received from the vehicle through the wireless communication unit 33, the device controller 35 may stand by for a preset period of time from when the emergency situation message is received, and may monitor whether an additional message is received from the corresponding vehicle.

If a release message is received from the corresponding vehicle within the standby time, the device controller 35 may determine that the emergency situation of the corresponding vehicle has been released.

In contrast, if the emergency situation message is received within the standby time again, or if an additional message is not received, the device controller determines that the emergency situation of the corresponding vehicle is sustained.

When it is determined that the emergency situation of the vehicle is sustained, the device controller 35 transmits the emergency situation message, received from the corresponding vehicle, and the unique number of the emergency situation detecting device 10 to the road-side unit 30 therearound or the rescue center 50.

Meanwhile, each road-side unit 30 has a unique ID, and when the road-side unit 30 transmits the emergency situation message of the vehicle to the rescue center 50, the rescue center 50 may identify the location of the road-side unit 30 from the ID of the road-side unit 30, thereby more rapidly identifying the location of the vehicle that is in an emergency situation. A process of detecting and relaying a vehicle state by the vehicle emergency situation detecting system, according to the embodiment of the present invention, which has such a constitution, will be described with reference to FIGS. 4 and 5 as follows.

Figure 4:
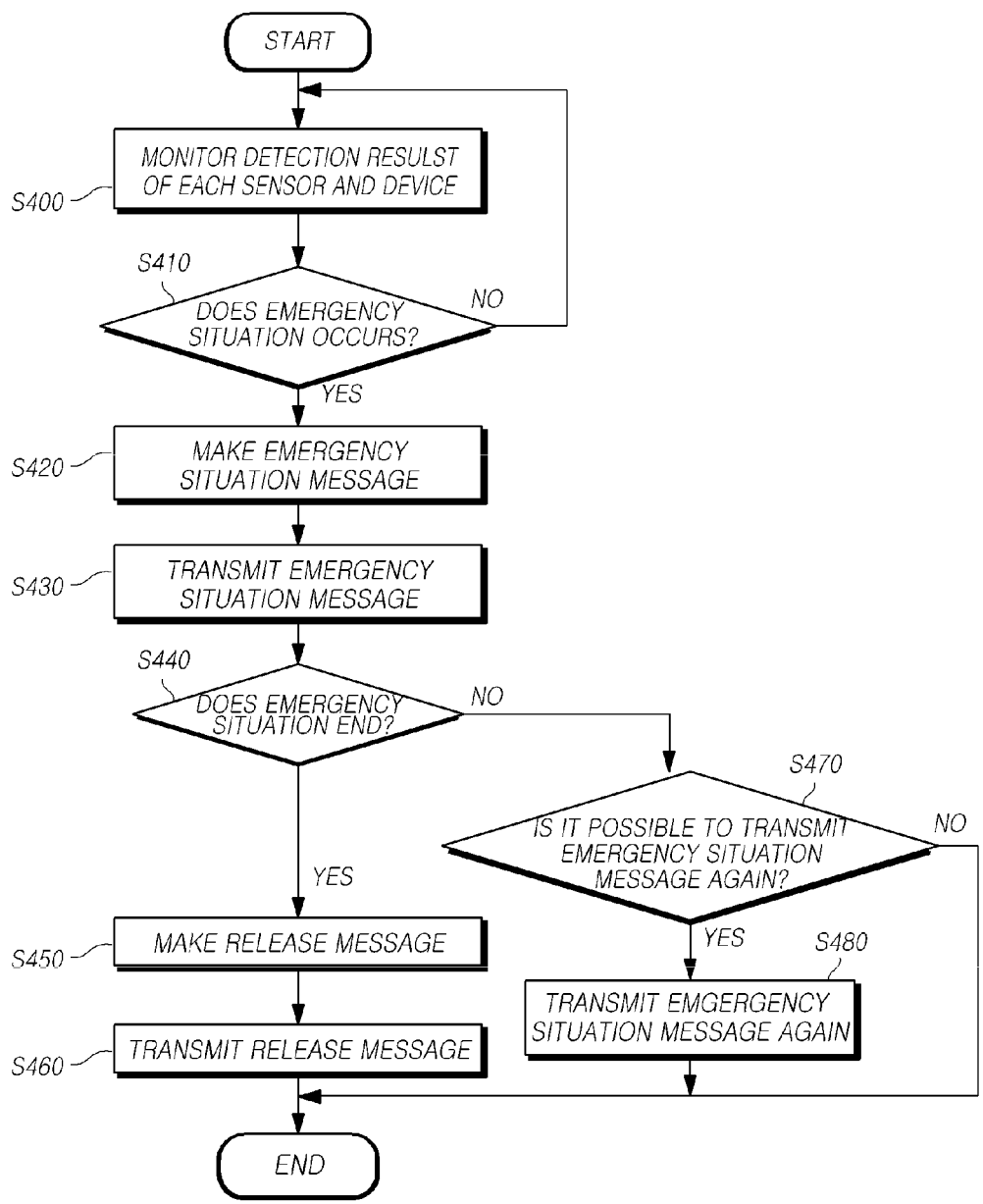
FIG. 4 is a flowchart illustrating a process of detecting an emergency situation of a vehicle by the vehicle emergency situation detecting system according to the embodiment of the present invention.

FIG. 4 is a flowchart illustrating a process of detecting an emergency situation of a vehicle by the vehicle emergency situation detecting system according to the embodiment of the present invention.

When the vehicle starts to travel, each sensor and device detects the driving state of the vehicle, and the emergency situation determining unit 11 monitors information provided from each sensor and device and determines an emergency situation of the vehicle (S400). When the emergency situation determining unit 11 determines that the vehicle is in an emergency situation (S410), the controller 13 makes an emergency situation message (S420) and broadcasts the emergency situation message along with the unique number of the emergency situation detecting device 10 (S430).

Thereafter, when the emergency situation determining unit 11 determines that the emergency situation has ended (S440), the controller 13 makes a release message and broadcasts the release message (S450 and S460). In cases where the emergency situation does not end, if retransmission of the emergency situation message is possible (S470), the controller 13 transmits the emergency situation message again (S480). If the emergency situation detecting device 10 breaks down, it is impossible to transmit the emergency situation message again.

Figure 5:
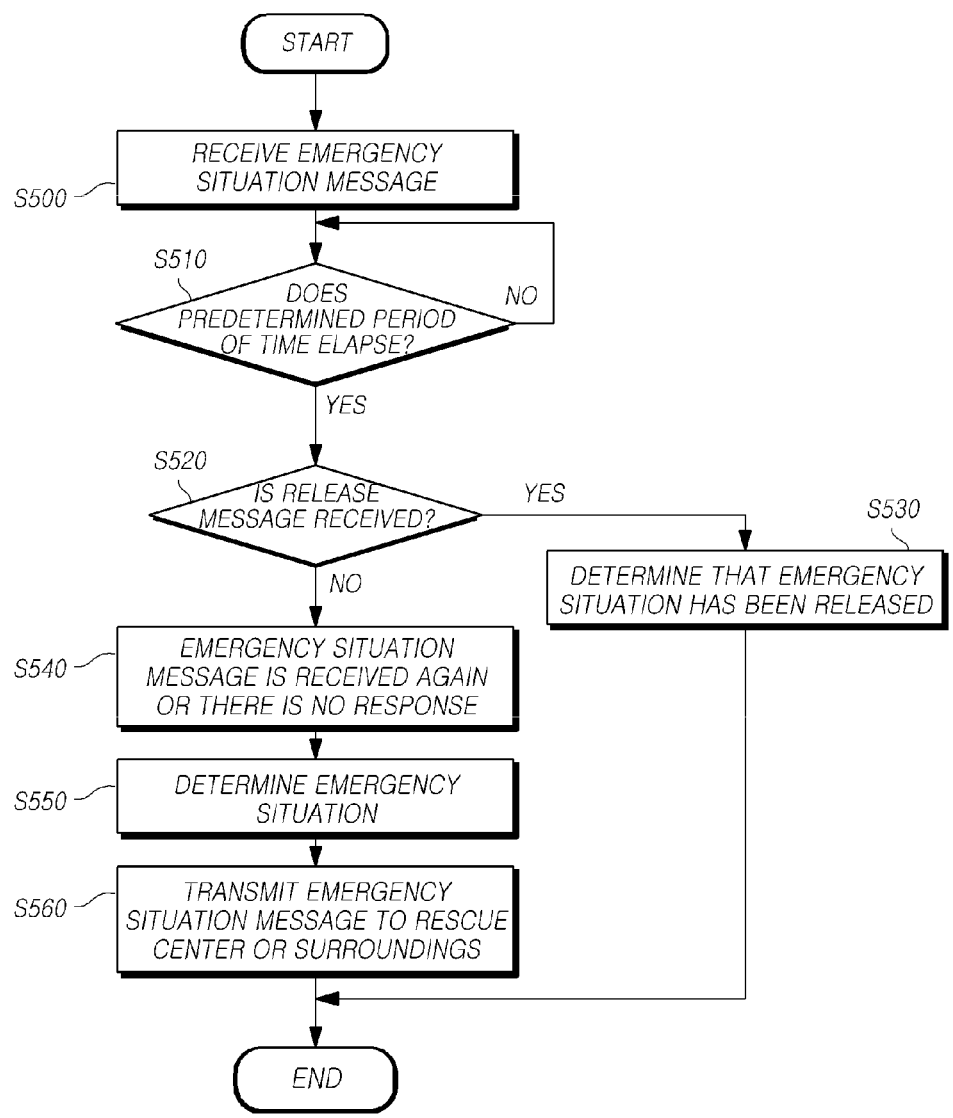
FIG. 5 is a flowchart illustrating a process of processing an emergency situation message by a surrounding vehicle and a road-side unit that receive the emergency situation message in the vehicle emergency situation detecting system according to the embodiment of the present invention.

FIG. 5 is a flowchart illustrating a process of processing an emergency situation message by a surrounding vehicle and a road-side unit that receive the emergency situation message in the vehicle emergency situation detecting system according to the embodiment of the present invention.

When receiving an emergency situation message from a vehicle (S500), the surrounding vehicle and the road-side unit 30 stand by for a predetermined period of time (S510), and when receiving a release message within a predetermined period of time (S520), the surrounding vehicle and the road-side unit 30 determine that the emergency situation of the vehicle has been released (S530). However, when the release message is not received within the predetermined period of time, and the emergency situation message is received again or no message is received (S540), the surrounding vehicle and the road-side unit 30 determine that there is an abnormality in the vehicle that transmitted the emergency situation message (S550).

In cases where the road-side unit 30 receives the emergency situation message of the vehicle, the road-side unit 30 may directly transmit the unique number of an emergency situation detecting device 10 of the corresponding vehicle and the emergency situation message to the rescue center 50 (S560). However, in cases where the surrounding vehicle rather than the road-side unit 30 receives the emergency situation message of the vehicle, a controller 13 of the surrounding vehicle broadcasts the unique number of the vehicle, which is in the emergency situation, and the emergency situation message to the surroundings again (S560). If the road-side unit 30 or the rescue center 50 is located adjacent to the surrounding vehicle, information on the emergency situation of the vehicle may be directly transmitted to the rescue center 50. However, in cases where the road-side unit 30 or the rescue center 50 is not located adjacent to the surrounding vehicle, the emergency situation message is broadcast until a signal reaches the road-side unit 30 or the rescue center 50.

In this specification, an abnormal state of a vehicle may be represented to be an emergency situation or an emergency state, and a state where an emergency situation of another vehicle is monitored and it is determined that the abnormal state of the other vehicle has to be propagated to the outside may be represented to be an emergency propagation state.

Furthermore, the device that receives the emergency situation message of the vehicle and broadcasts the unique number of the vehicle, which is in the emergency situation, and the emergency situation message to the surroundings again in the above example may be represented as an emergency situation propagation device, and the emergency situation propagation device may be implemented in the interior of the surrounding vehicle or the road-side unit in the vicinity of the vehicle that is in the emergency situation.

Figure 6:
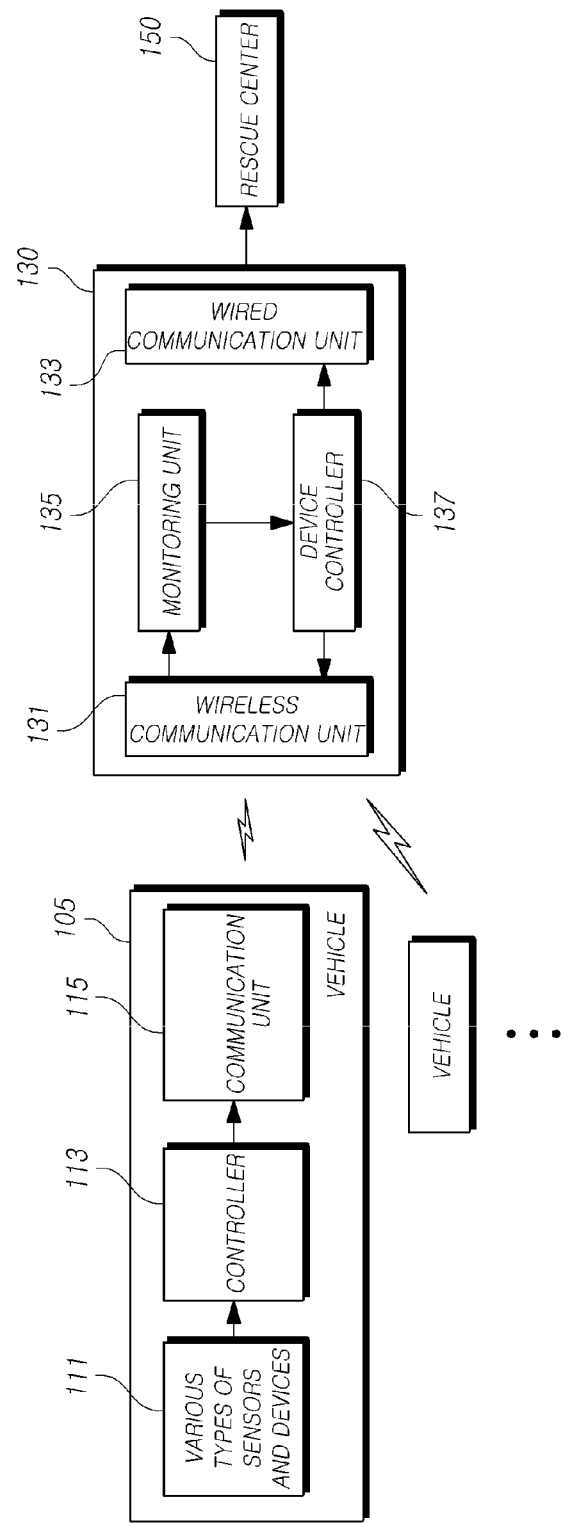
FIG. 6 is a block diagram illustrating a constitution of a vehicle emergency situation detecting system according to another embodiment of the present invention.

FIG. 6 is a block diagram illustrating a constitution of a vehicle emergency situation detecting system according to another embodiment of the present invention.

In the vehicle emergency situation detecting system, according to the other embodiment of the present invention, a road-side unit 130 may determine an emergency situation of a vehicle 105 using information provided from the vehicle 105. After the determination of the emergency situation, the road-side unit 130 stands by for a predetermined period of time, verifies the emergency situation, and broadcasts the emergency situation of the vehicle 105 to a surrounding vehicle 105 or a rescue center 150.

The vehicle 105, according to this embodiment, may include various types of sensors and devices 111, a communication unit 115, and a controller 113.

Here, examples of the sensors may include a speed sensor, a wheel sensor, an acceleration sensor, a lateral acceleration sensor, a yaw rate sensor, a rollover detecting sensor, and the like as in the above-described embodiment.

The communication unit 115 may support communication with the road-side unit 130 and the surrounding vehicle 105, and may use one of Wi-Fi, Wibro, and DSRC as a communication scheme.

The controller 113 may collect information from the various types of sensors and devices and may transmit the collected information to the road-side unit 130 and the surrounding vehicle 105 through the communication unit 115.

The road-side unit 130 may include a wired communication unit 133 for communication with another road-side unit 130 and the rescue center 150, a wireless communication unit 131 for communication with the vehicle 105, a monitoring unit 135 that determines an emergency situation of the vehicle 105, and a device controller 137 that transfers the emergency situation of the vehicle 105 to the rescue center 150 through a verification process when an emergency situation determining unit 11 determines the emergency situation.

The wired communication unit 133 may be connected to a wired network to support communication with the other road-side unit 130 therearound and the rescue center 50 and to support a TCP/IP protocol based communication.

The wireless communication unit 131 may support wireless communication with the vehicle 105 and may use the same communication scheme as the communication unit 115 of the vehicle 105, namely, may use one of Wi-Fi, Wibro, and DSRC. The information that the controller 113 of the vehicle 105 collects from the various types of sensors and devices is transmitted together with the unique number of the vehicle 105 to the road-side unit 130 through the wireless communication unit 131.

The monitoring unit 135 may determine an emergency situation of the vehicle 105 using the various types of information received from the vehicle 105. The monitoring unit 135 may determine the emergency situation of the vehicle 105 in the same way that the emergency situation determining unit 11 determines the emergency situation of the vehicle 105 using the information collected from the various types of sensors and devices in the above-described embodiment. A method of determining the emergency situation has been described in the above-described embodiment, and therefore a repetitive description thereof will be omitted.

When the monitoring unit 135 determines that the vehicle 105 is in an emergency situation, the device controller 137 observes information transmitted from the corresponding vehicle 105 for a predetermined standby time. While the predetermined standby time passes, if the collected information continually represents that the vehicle 105 is in the emergency situation, the device controller 137 transfers the emergency situation of the vehicle 105 to the other road-side unit 130, the rescue center 150, and the surrounding vehicle 105 through the wired communication unit 133.

Meanwhile, if no response or information is provided from the vehicle 105 within the standby time, the device controller 137 determines that the device that transmits information in the vehicle 105 has broken down, or determines that the vehicle 105 is in an emergency situation, and transfers the emergency of the vehicle 105 to the outside. Further, when information is received from the vehicle 105, but the information detected by the various types of sensors or devices does not agree with each other, the device controller 137 also determines that the vehicle 105 is in an emergency situation.

In contrast, when it is determined from the information collected within the standby time that the emergency situation of the vehicle 105 has been released, the device controller 137 determines that the vehicle 105 is not in an emergency situation.

Figure 7:
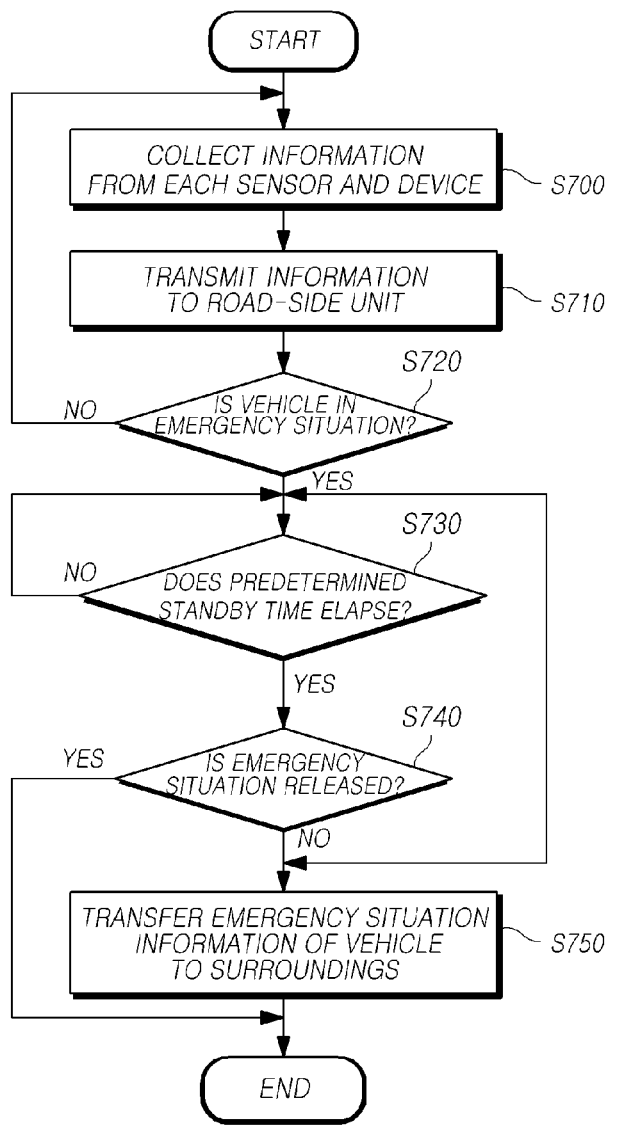
FIG. 7 is a flowchart illustrating a process of detecting and relaying a vehicle's emergency situation by the vehicle emergency state detecting system according to the other embodiment of the present invention.

A process of detecting and relaying an emergency situation of the vehicle 105 by the vehicle emergency situation detecting system, according to the other embodiment of the present invention, which has such a constitution, will be described with reference to FIG. 7 as follows.

When the vehicle 105 starts to travel, the various types of sensors and devices 111 detect the driving state of the vehicle 105, and the controller 113 of the vehicle 105 collects information provided from the various types of sensors and devices 111 (S700). Thereafter, the controller 113 transmits the collected information to the road-side unit 130 through the communication unit 115 (S710).

The monitoring unit 135 of the road-side unit 130 determines an emergency situation of the vehicle 105 using the information provided from the vehicle 105 (S720). When it is determined that the vehicle 105 is in an emergency situation, the device controller 137 stands by for a predetermined period of time and observes the determination results of the monitoring unit 135 (S730). If the monitoring unit 135 determines that the emergency situation has not been released (S740), that is, if the information detected by the various types of sensors and devices 111 does not agree with each other, or the controller is in a non-response state where a signal is not provided from the vehicle 105, the device controller 137 transfers the emergency situation of the vehicle 105 to the rescue center 150, the other road-side unit 130, and the surrounding vehicle 105 through the wired communication unit 133 and the wireless communication unit 131 (S750).

Meanwhile, although the embodiment in which a vehicle having an emergency situation detecting device 10 installed therein detects an emergency situation thereof and the other embodiment in which the road-side unit 130 receives information from a vehicle and detects an emergency situation of the vehicle 105 have been described above, it is apparent that all of the vehicle 105 and the road-side units 30, 130 may also be configured to detect an emergency situation.

As described above, in the present invention, when information that the vehicle 105 is in an emergency situation is collected, the road-side unit 30 or 130 or the surrounding vehicle 105 stands by for a predetermined period of time, verifies the emergency situation, and notifies the emergency situation of the corresponding vehicle 105 to the rescue center 150, the other road-side unit 30 or 130, and the surrounding vehicle 105 when the emergency situation is identified. Accordingly, it is possible to rapidly inform the emergency situation of the vehicle 105 to the rescue center 150 and provide accurate information, thereby performing an efficient rescue.

Figure 8:
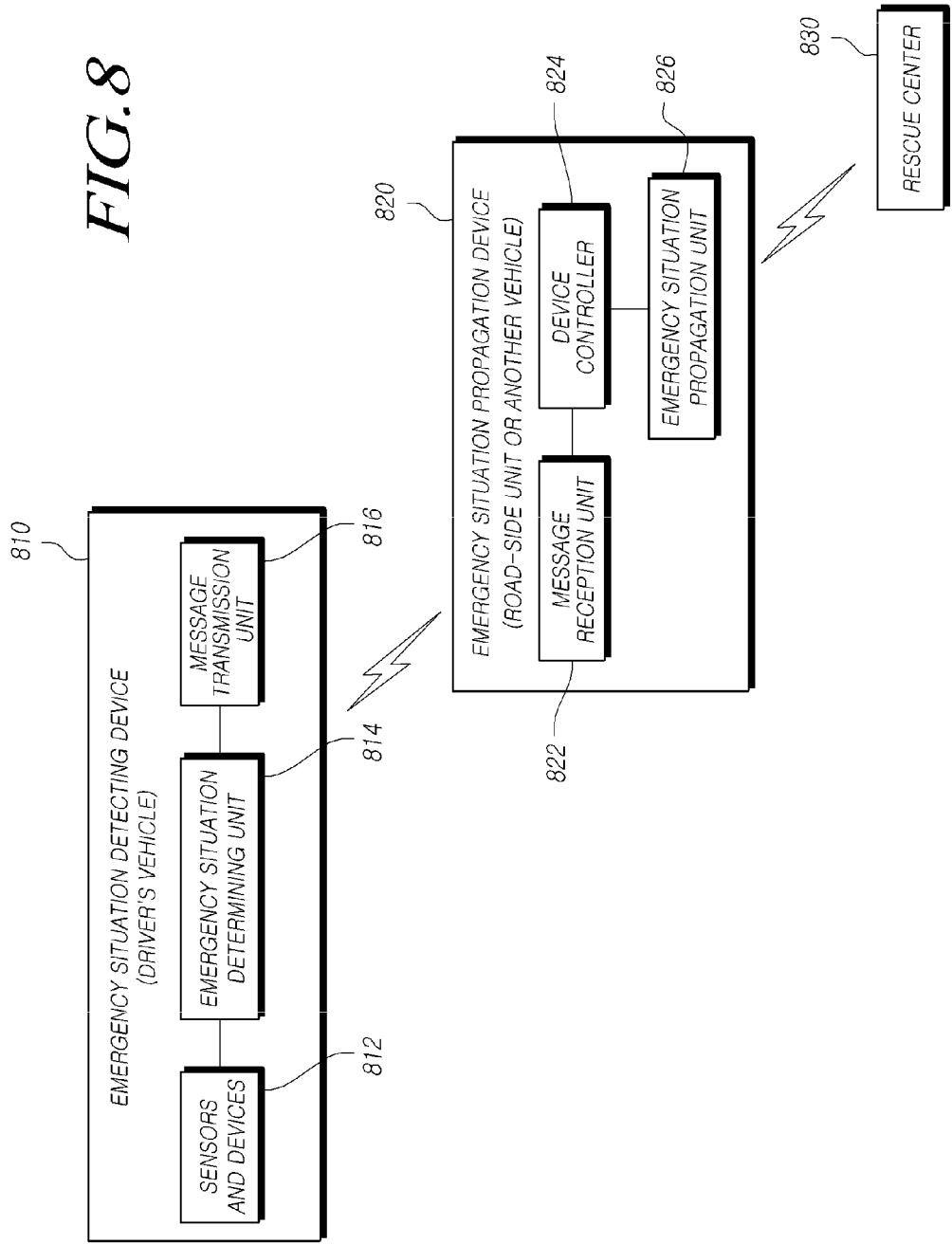
FIG. 8 is a diagram of an emergency situation detecting system, according to the present invention, which is represented in a different form.

FIG. 8 is a diagram of an emergency situation detecting system, according to the present invention, which is represented in a different form.

The emergency situation detecting system, illustrated in FIG. 8, may include: an emergency situation detecting device 810 mounted in a target vehicle (a driver's vehicle) where an emergency situation occurs; an emergency situation propagation device 820 that receives a message from the vehicle in the emergency situation, determines an emergency propagation state, and propagates the emergency situation to an external rescue center; and a rescue center system 830 that finally receives information on the emergency situation of the vehicle.

The emergency situation propagation device 820 may be installed in another vehicle other than the vehicle in the emergency situation, or may be implemented in the interior of a road-side unit or a separate traffic control device external to the vehicle.

In this specification, the first vehicle where an emergency situation occurs is referred to as a driver's vehicle, and the second vehicle, as an emergency situation propagation device, which propagates the emergency situation of the driver's vehicle to an external rescue center is referred to as another vehicle, an external vehicle, or a surrounding vehicle.

Further, an abnormal state of the driver's vehicle may be represented to be an emergency situation or an emergency state, and a state where an emergency situation of the other vehicle is monitored and it is determined that the abnormal state of the other vehicle has to be propagated to the outside may be represented to be an emergency propagation state.

The emergency situation detecting device 810 may include: a sensor unit 812 constituted with one or more of a speed sensor, a wheel sensor, an acceleration sensor, a lateral acceleration sensor, a yaw rate sensor, and a tilt sensor; an emergency determining unit 814 that receives a signal from the sensor unit 812 and determines whether the driver's vehicle is in an emergency situation; and a communication unit 816 that creates at least one of an emergency situation message representing the emergency situation of the driver's vehicle and a release message representing release of the emergency situation according to the determination result of the emergency situation determining unit 814, transmits the message to an external emergency situation propagation device, and allows the emergency situation propagation device to propagate an emergency propagation state of the driver's vehicle to the outside.

Since an emergency situation determining method of the emergency situation determining unit 814, an emergency situation message, and the like are the same as the above-described ones, repetitive descriptions thereof will be omitted. Furthermore, in some cases, the emergency situation detecting device 810 and the emergency situation propagation device 820 may be mounted in a single vehicle. In this case, the emergency situation detecting device 810 may further include a device controller that determines whether another vehicle is in an emergency propagation state based on an emergency situation message or a release message that is transmitted from the other vehicle, and transmits information on the other vehicle in the emergency situation and the emergency situation message to an external device that includes a rescue center when it is determined that the other vehicle is in the emergency propagation situation.

Standard contents or standard documents that are mentioned in the above-described embodiments are omitted in order to make a description of the specification brief, and constitute a part of this specification. Therefore, when a part of the content and documents associated with the standard is added to the present specifications or is specified in claims, it should be construed as a part of the present invention.

Although the embodiments of the present invention have been described for illustrative purposes, those skilled in the art will appreciate that various modifications, additions and substitutions are possible, without departing from the scope and spirit of the invention. Therefore, exemplary aspects of the present disclosure have not been described for limiting purposes. The scope of the present invention shall be construed on the basis of the accompanying claims in such a manner that all of the technical ideas included within the scope equivalent to the claims belong to the present invention.

| Description of reference numerals | |
|---|---|
| 10: Emergency situation detecting device | |
| 11: Emergency situation determining unit | |
| 13: Controller | 15: Communication unit |
| 21: Speed sensor | 22: Wheel sensor |
| 23: Acceleration sensor | 24: Lateral acceleration sensor |
| 25: Yaw rate sensor | 26: Rollover detecting sensor |
| 30: Road-side unit | 31: Wired communication unit |
| 33: Wireless communication unit | |
| 35: Device controller | 50: Rescue center |

What is claimed is:

1. An apparatus for detecting an emergency situation of a vehicle, comprising:
a sensor unit constituted with at least one sensor of a speed sensor, a wheel sensor, an acceleration sensor, a lateral acceleration sensor, a yaw rate sensor, and a tilt sensor;
an emergency situation determining unit connected with the sensor unit, and configured to
receive a sensed signal from the sensor unit, and determine whether the vehicle is in an emergency situation; and
a communication unit configured to communicate with another vehicle via wireless communication; and a controller connected with the emergency situation determining unit and the communication unit, and configured to
generate an emergency situation message representing the emergency situation of the vehicle or the another vehicle and a release message representing the release of the emergency situation according to the determination result of the emergency situation determining unit,
transmit, through the communication unit, the generated messages to the another vehicle or a road-side unit for causing the another vehicle or the road-side unit to propagate the transmitted messages to other vehicles on the road within a wireless communication rage of the another vehicle or the road-side unit,
determine whether the vehicle or the another vehicle is in the emergency situation, and
transmit information on the vehicle or the another vehicle in the emergency situation and the emergency situation message to an external device included in a rescue center,
wherein the sensor unit is constituted with the speed sensor and acceleration sensor,
wherein the emergency situation determining unit determines that the vehicle is in the emergency situation when a speed of the vehicle detected by the speed sensor and acceleration detected by the acceleration sensor at the same time point exceed preset threshold values,
wherein the controller is configured to receive another emergency situation message representing an emergency situation of the another vehicle, and when the controller receives the another emergency situation message twice in preset standby time period or the controller fails to receive another release message representing a release state of the emergency situation of the another vehicle in preset standby time after the received emergency situation message, transmit the received another emergency situation message to the other vehicles, and
wherein the emergency situation message and the release message are defined as SystemFailureSuspectFlag and SystemFailureRecoveryFlag, respectively, and are transmitted while being included in a part II message of a Basic Safety Message (BSM) for vehicle communication.

2. The apparatus of claim 1,
wherein the at least one sensor further includes the acceleration sensor, and
wherein the emergency situation determining unit determines that the vehicle is in the emergency situation when a change in acceleration detected by the acceleration sensor exceeds a preset threshold value.

3. The apparatus of claim 1,
wherein the at least one sensor further includes the lateral acceleration sensor, and
wherein the emergency situation determining unit determines that the vehicle is in the emergency situation when a change in lateral acceleration detected by the lateral acceleration sensor exceeds a preset threshold value.

4. The apparatus of claim 1,
wherein the at least one sensor further includes the yaw rate sensor, and
wherein the emergency situation determining unit determines that the vehicle is in the emergency situation when a yaw rate value detected by the yaw rate sensor exceeds a preset threshold value.

5. The apparatus of claim 1,
wherein the at least one sensor further includes the tilt sensor, and
wherein the emergency situation determining unit determines that the vehicle is in the emergency situation when a tilt of the vehicle detected by the tilt sensor exceeds a preset threshold value.

6. The apparatus of claim 1,
wherein the at least one sensor further includes the wheel sensor, and
wherein the emergency situation determining unit determines that the vehicle is in the emergency situation when driving speeds of front and rear wheels detected by the wheel sensor are different from each other in out of a preset threshold value.

7. A method for detecting an emergency situation of a vehicle, the method performed by a vehicle emergency situation detecting apparatus comprising a sensor unit, a communication unit and control unit, the method comprising:
receiving a signal from the sensor unit constituted with at least one sensor of a speed sensor, a wheel sensor, an acceleration sensor, a lateral acceleration sensor, a yaw rate sensor, and a tilt sensor;
determining whether the vehicle is in an emergency situation based on the signal from the sensor unit;
generating an emergency situation message representing the emergency situation of the vehicle or the another vehicle and a release message representing the release of the emergency situation according to the determination result of the determining;
transmitting, through the communication unit, the generated messages to another vehicle or a road-side unit for causing the another vehicle or the road-side unit to propagate the transmitted messages to other vehicles on the road within a wireless communication rage of the another vehicle or the road-side unit,
determining whether the vehicle or the another vehicle is in the emergency situation; and
transmitting information on the vehicle or the another vehicle in the emergency situation and the emergency situation message to an external device included in a rescue center,
wherein the sensor unit is constituted with the speed sensor and acceleration sensor,
wherein the control unit determines that the vehicle is in the emergency situation when a speed of the vehicle detected by the speed sensor and acceleration detected by the acceleration sensor at the same time point exceed preset threshold values,
wherein the control unit receives another emergency situation message representing an emergency situation of the another vehicle via the communication unit, and when the another emergency situation message is received twice in preset standby time period or the control unit fails to receive another release message representing a release state of the emergency situation of the another vehicle in preset standby time after the received emergency situation message, the received another emergency situation message is transmitted to the other vehicles, and
wherein the emergency situation message and the release message are defined as SystemFailureSuspectFlag and SystemFailureRecoveryFlag, respectively, and are transmitted while being included in a part II message of a Basic Safety Message (BSM) for vehicle communication.

* * * * *